July 10, 1934. J. S. PARSONS 1,966,215
RELAY OPERATION INDICATOR
Filed Jan. 5, 1929
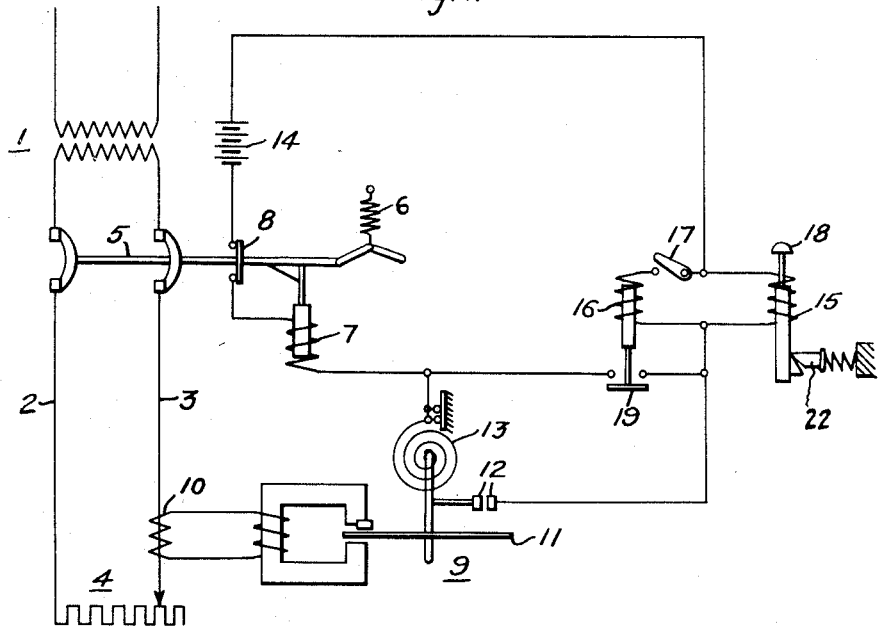
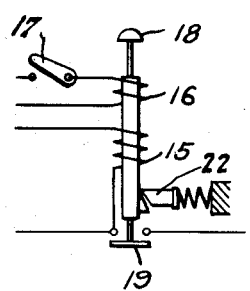
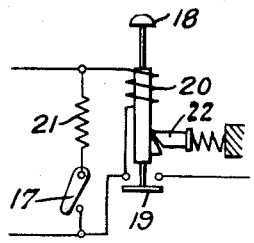
INVENTOR
John S. Parsons.
BY
ATTORNEY Patented July 10, 1934

1,966,215

UNITED STATES PATENT OFFICE 1,966,215

RELAY-OPERATION INDICATOR

John S. Parsons, East Orange, N. J., assignor to Westinghouse Electric & Manufacturing Company, a corporation of Pennsylvania Application January 5, 1929, Serial No. 330,522

2 Claims. (Cl. 177—311)

My invention relates to protective systems and more particularly to means for affording an indication of the operation of protective relays, circuit interrupters or the like embodied in such systems.

The values of current which obtain in control circuits of various types for controlling the operation of circuit interrupters and similar apparatus, vary over a wide range, depending upon the current requirements of the operating coil of the circuit interrupter or apparatus to be controlled.

In some cases, the operating winding is of such dimensions that a current of only a small magnitude is required to effect the operative energization thereof and, in that event, the winding of an operation-indicator associated therewith must comprise a relatively large number of turns of relatively small-gauge wire.

If it is attempted to employ an operation-indicator with this type of winding in a control circuit wherein current of larger value is required, the impedance or resistance of the winding of the indicator may so limit the current in the control circuit that the circuit interrupter will fail to operate or will operate incorrectly or, in some cases, the interrupter will operate before the operation-indicator winding is sufficiently energized.

It has been necessary, in practice, therefore, to consider each circuit-breaker-control circuit as a separate problem and to design the winding of the operation-indicator to be used therewith specifically with respect thereto, in order to insure proper operation of the circuit interrupter and operation indicator.

As a result, it has been necessary for the manufacturer to provide operation-indicators having windings of various dimensions, or, where the windings of the operation-indicators are interchangeable, it has been necessary to maintain a considerable stock of said windings.

It is an object of my invention, therefore, to provide an operation-indicator which is universal in its application to commercial relay control-circuits, irrespective of the magnitude of the current traversing said circuits.

In practicing my invention, I provide a control circuit comprising the operating winding of a circuit interrupter, a source of current, the contacts of a protective relay and the operating winding of an operation-indicator, all connected in series-circuit relation. I provide further, an auxiliary contactor having the operating winding thereof connected in shunt with respect to said operation-indicator and having contacts controlling a circuit adapted to short circuit said relay contacts under certain conditions.

In the drawing,

Figure 1 is a schematic diagram of a control circuit embodying my invention, and Figs. 2 and 3 are schematic illustrations, respectively, of modified forms of operation-indicators of the type shown in Fig. 1.

Referring more particularly to Fig. 1, the circuit to be controlled comprises a source of power 1 which, in the present instance, is merely a distribution transformer, and circuit conductors 2 and 3 operatively connected to energize a load 4.

A circuit interrupter 5 is associated with the conductors 2 and 3 to control the connection thereof to the transformer 1. The circuit interrupter 5 is of a usual type which is normally held in closed position, under the influence of a spring 6 or other biasing means, and is adapted to be opened by an operating winding 7, in a usual manner. A pallet switch 8 is secured to the circuit interrupter to control the completion of the energizing circuit for the winding 7, in the usual manner.

An induction relay 9 which, in the present embodiment is of the usual over-current induction type, comprises an operating electromagnet having the winding thereof energized from a current transformer 10 associated with the conductor 3 and adapted to cause the rotation of a disc armature 11 when the magnitude of the current traversing the conductor 3 attains a predetermined magnitude. Contacts 12 are controlled by the movement of the disc 11 to complete the control circuit for the circuit interrupter 5 upon the occurrence of over-current conditions. The contacts, however, are normally maintained in open position by means of a coil spring 13 secured to the shaft of the disc 11 in the usual manner.

The control circuit for the circuit breaker 5 includes a source of power 14, the pallet switch 8 associated with the circuit interrupter, the operating winding 7, the coil spring 13 and the contacts 12 of the relay, and the operating winding 15 of an operation-indicator, all connected in series-circuit relation. The operating winding 16 of an auxiliary contactor is connected in parallel with the winding 15 of the indicator, and the circuit thereof may be controlled by a manually operable switch 17.

The operation-indicator may be of any well known type employing an operating winding to control the position of an indicator or target 18, in a well known manner. These devices are well known in the art, as shown in the U. S. patent to Sleeper No. 1,664,326, and operate to expose the target 18 to view when the winding 15 is properly energized. The operation indicator is provided with a mechanical latch, illustrated generically by the latch 22, which serves to maintain the indicator in its operated position.

The auxiliary contactor is also of a usual type and controls, by means of a bridging contact 19, a circuit which shunts the contacts 12 of the relay 9. In practice, the auxiliary contactor, as well as the operation-indicator, is mounted in the same casing with the relay 9, but, in the present illustration, it is shown as removed therefrom for the purpose of clearness.

The auxiliary contactor is constructed and adjusted to operate to close the contacts 19 when the current traversing the control circuit attains its limiting maximum value, assuming that the switch 17 is in closed position. The winding 16 of the contactor is constructed to have a relatively low value of impedance, as compared with the impedance of the winding 7 of the circuit interrupter 5, the object being to obtain a voltage drop across the trip coil 7 which is substantially equal to the voltage of the source 14, and thus to insure reliable operation. In other words, it is desirable that the current from the source 14 supplied to the operating winding 7 shall not be greatly limited by the winding 16 of the auxiliary contactor.

The winding 15 of the operation-indicator is preferably of a relatively high value of impedance or resistance, as compared with that of the winding 16 of the auxiliary contactor.

The relative impedance values of the windings 16 and 15 are so chosen that for any commercial relay control circuit, only the single operation indicator having the winding 15 is necessary. To permit this universal application of only one design of operation indicator, the impedance of winding 15 is made sufficiently high to permit its effective energization for control circuit currents up to substantially 2.5 amperes and still permit the effective energization of tripping coil 7. In practice, the lowest effective current for the winding 15 is substantially 0.2 ampere.

When the impedance of the tripping coil 7 or the characteristics of the circuit breaker 5 are such that a greater control circuit current is necessary for the effective energization of the coil 7, the switch 17 is closed and the arrangement may be used for current values from 2.5 amperes to substantially 30 amperes. The current values above noted are those encountered in commercial practice and, obviously, such values may be altered to correspond to any contemplated commercial requirements.

In operation, assuming that the trip coil or operating winding 7 has a relatively high impedance, the current in the control circuit will be of a relatively small value. This value may well be within the safe current-carrying capacity of the relay contacts 12, and, in that event, the auxiliary contactor 16 is not necessary. The manually operable switch 17 may, therefore, be moved to the open position thereof to break the circuit to the contactor winding 16.

It will be obvious that, under these conditions, upon the occurrence of an overload in the conductor 3, the relay 9 will operate to close the contacts 12, and the control circuit will then be closed to energize the operating winding 7 and to effect the operation of the indicator 15.

Assuming, however, that the operating winding 7 of the circuit interrupter is of a relatively low value of impedance, upon the closure of the relay contacts 12, a relatively large current will traverse the control circuit which may be of sufficient magnitude to be beyond the safe current-carrying capacity of the contacts 12. Also, at the relatively high value of current traversing the circuit, the voltage drop across the indicator winding 15 may be sufficiently high to interfere with the operative energization of the operating winding 7 of the circuit interrupter. When these circuit conditions obtain, it is desirable that the manually operable switch 17 be in the closed position thereof so that, when the relay contacts 12 are closed in response to an overload condition, the winding 16 of the auxiliary contactor will be operatively energized, and the bridging contact 19, controlled thereby, will complete a circuit shunting the relay contacts 12.

Since the circuit through the relay contacts 12 includes the coil spring 13, the impedance or resistance of this circuit will be high, as compared with the shunt circuit controlled by the bridging contact 19. The division of current between these two paths will be such that the greater portion of the current will traverse the bridging contact 19 and thereby prevent a damaging value of current from traversing the relay contacts 12.

Further, since the impedance of the winding 16 is low, as compared with that of the winding 15, the greater portion of the control current will traverse the winding 16, and any undesirable operation of the circuit breaker 5, resulting from the voltage drop across the indicator winding 15, will be avoided.

Although the major portion of the control-circuit current will traverse the winding 16 of the auxiliary contactor, a certain amount of current will traverse the winding 15 of the operation-indicator and this will be sufficient to cause the operative energization thereof to expose the target 18 to view.

From the above description, it is apparent that an operation-indicator, having a winding 15 of relatively high impedance or resistance, may be employed with a control circuit including an auxiliary contactor 16, irrespective of the magnitude of the source of current 14.

Obviously, the specific construction of the operation-indicator, the auxiliary contactor and the control relay 9 may be varied considerably without departing from the present invention.

For example, referring to Fig. 2, the same result may be accomplished by combining the functions of the windings 15 and 16 as shown in Fig. 1. Both of these windings are, in this embodiment, wound upon a common movable armature having the indicating target 18 affixed to one end thereof, and the bridging contact 19 secured to the other end thereof. In operation, when the contacts 12 are closed, assuming an interrupter-operating coil 7 having a low-impedance value, the windings 15 and 16 will be energized to raise the plunger to move the target 18 into view and to close the bridging contacts 19 to shunt the contacts of the relay 12.

Another modification is illustrated in Fig. 3, wherein a single winding 20 is employed, and an impedance or resistance 21 is shunted across this winding. Preferably, the value of the resistance or impedance 21 approximates a value corresponding to that of the winding 16 of Figs. 1 and 2. The operation of this modification will be substantially identical with that above described.

Further, although I have shown and described an operation indicator for use in conjunction with the auxiliary contactor of an over-load relay, quite obviously, the specific type of relay employed is immaterial, so far as this combination of elements is concerned.

Also, whether the winding 16 is that of an auxiliary contactor or not is immaterial. For example, the winding 16 may constitute a holding magnet for increasing the pressure on the main contacts 12 of the relay.

Various modifications may be made in my invention without departing from the spirit and scope thereof, and I desire, therefore, that only such limitations shall be placed thereon as are imposed by the prior art and set forth in the appended claims.

I claim as my invention:

1. In protective apparatus of the class in which a protective relay having contact members of limited current carrying capacity is provided for controlling a circuit breaker having a trip coil and in which an operating current of magnitude determined by the design of the trip coil is circulated through the trip coil to cause opening of the circuit breaker; electromagnetic apparatus having a first parallel circuit and a second parallel circuit, said electromagnetic apparatus including an indicating element operable in response to a current of comparatively small magnitude in said first parallel circuit and an armature element electromagnetically operable in response to current in said second parallel circuit; manually adjustable means for controlling the effectiveness of said second parallel circuit; a source of operating current; means controlled by said armature element for preventing the overloading of said contact members and a control circuit including the trip coil of said circuit breaker, said contact members of said protective relay, said parallel circuits and said source; whereby part only of the operating current for said trip coil may be circulated through said first parallel circuit if said trip coil requires an operating current of large magnitude, and all of the operating current for said trip coil may be circulated through said first parallel circuit if said trip coil requires an operating current of small magnitude, to thereby insure proper operation of said indicating element with tripping currents extending over a comparatively wide range of values.

2. In protective apparatus of the class in which a protective relay having relay contact members of limited current carrying capacity is provided for controlling a circuit breaker having a trip coil and in which an operating current of magnitude determined by the design of the trip coil is circulated through the trip coil to cause opening of the circuit breaker; an operation indicator operable in response to a current of comparatively small magnitude, said operation indicator having an operating coil of standardized design; a source of operating current; a control circuit including the trip coil of said circuit breaker, said contact members of said protective relay, said operating coil and said source; an auxiliary contactor element having a contactor coil connected in parallel to said operating coil, and having contactor contact members connected in parallel to said relay contact members and operable in response to current of predetermined value in said contactor coil, said contactor coil having impedance of relatively small value as compared to the impedance of said operating coil; and manually adjustable means for controlling the effectiveness of said contactor coil; whereby part only of the operating current for said trip coil may be circulated through said operating coil and part only through said relay contact members if said trip coil requires an operating current of large magnitude, and all of the operating current for said trip coil may be circulated through said operating coil if said trip coil requires an operating current of small magnitude.

JOHN S. PARSONS.